United States Patent [19]

Moessmer et al.

[11] Patent Number: 5,953,984
[45] Date of Patent: Sep. 21, 1999

[54] FOOD DIMINUTION AND EMULSIFICATION APPARATUS

[75] Inventors: Michael Moessmer, Betzweiler-Waelde; Eberhard Haack, Halle, both of Germany

[73] Assignee: Inoflex Fleisch-Lebensmittel-technik und -technologie, Halle, Germany

[21] Appl. No.: 08/949,226

[22] Filed: Oct. 13, 1997

[30] Foreign Application Priority Data

Oct. 12, 1996 [DE] Germany ............................ 196 42 232

[51] Int. Cl.$^6$ ................. A23L 1/00; A23L 1/31; A22C 11/00; A22C 17/00
[52] U.S. Cl. ................ 99/494; 99/348; 99/472; 99/510; 241/82.5; 241/282.1; 366/318; 366/291; 452/35; 452/40
[58] Field of Search ............................. 99/348, 353, 467, 99/472, 486, 487, 494, 510; 100/117, 145, 148; 241/82.5, 82.6, 260.1, 285.2, 185.5, 282.1; 366/197, 200, 290, 206, 291, 139, 318, 601; 425/203, 204, 376.1, 812, 73; 426/646, 509.92, 518–520, 524, 513; 452/35, 40, 30, 38, 51, 198, 135, 138

[56] References Cited

U.S. PATENT DOCUMENTS

| | | |
|---|---|---|
| 3,575,224 | 4/1971 | Hughes ................... 366/192 X |
| 3,647,190 | 3/1972 | Iozzelli .................. 366/300 |
| 3,815,491 | 6/1974 | Guyer .................... 99/348 X |
| 3,897,723 | 8/1975 | Lucy, Jr. et al. .......... 99/467 |
| 4,112,545 | 9/1978 | Covington et al. ......... 99/494 X |
| 4,113,890 | 9/1978 | Long ..................... 426/512 |
| 4,382,404 | 5/1983 | Hawley et al. ............ 99/472 |
| 4,481,872 | 11/1984 | Matthews et al. ......... 99/353 |
| 4,548,829 | 10/1985 | McGehee ................ 426/518 |
| 4,700,899 | 10/1987 | Powers et al. ........... 426/486 X |
| 4,747,342 | 5/1988 | Schack et al. ........... 99/467 |
| 5,628,466 | 5/1997 | Haack et al. ............ 241/82.6 |
| 5,667,153 | 9/1997 | Haack et al. ............ 241/82.5 |

*Primary Examiner*—Timothy F. Simone
*Attorney, Agent, or Firm*—Karl Hormann

[57] ABSTRACT

A meat diminution and emulsifying apparatus comprising a housing having a plurality of interconnected chambers for rotatably receiving feed screws and rotary cutter assemblies therein, said feed screws and cutter assemblies being sequentially arranged and being provided intermediated two sets of rotary cutter assemblies with a chamber within which meat may be mixed and kneaded and provided with spices and other additives. The sequentially arranged cutter assemblies provide for progressively finer chopping of meat. A filler is provided at an output of the final cutter assembly for feeding chopped product into casings, and a conduit is provided between the output of the final cutter assembly and a feed screw ahead of it for recirculating meat for repeated chopping.

13 Claims, 2 Drawing Sheets

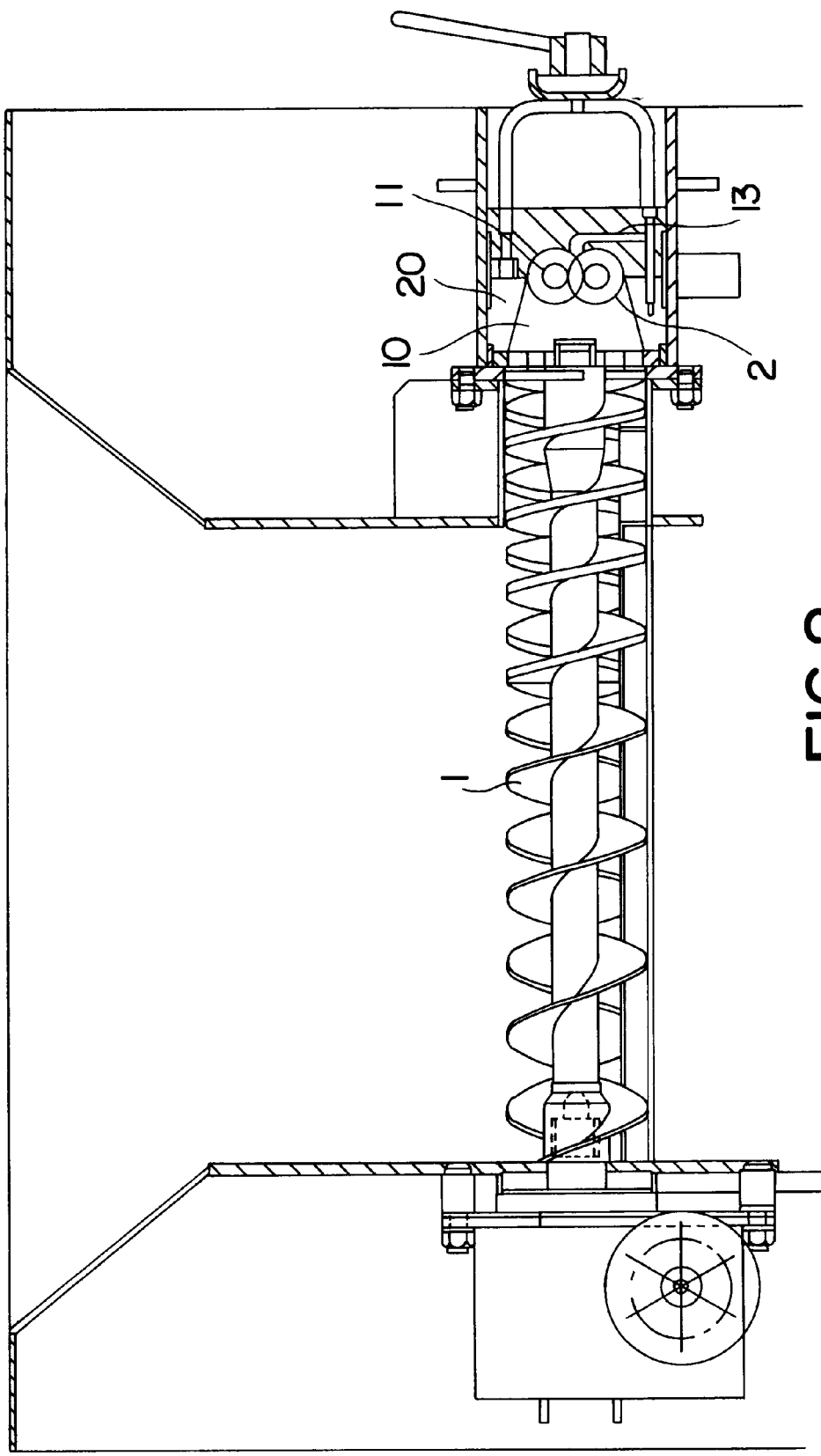

FOOD DIMINUTION AND EMULSIFICATION APPARATUS

BACKGROUND OF THE INVENTION

1. Field of the Invention.

The invention, in general, relates to a novel diminution and emulsifying apparatus useful in food processing and, more particularly, to an apparatus of the kind operating with augers and rotary chopping knives for preparing, from large pieces of raw materials, fillings for boiled, smoked, or cured sausages and the like, of selective degrees of fineness.

2. Description of the Prior Art.

In the manufacture of sausage products, raw materials, i.e. meat, fat and other ingredients, are chopped in diminution machines which as a rule operated with augers and rotary chopping knives. Depending upon the kind of equipment and the desired end product, diminution is carried out in a number of steps commencing with coarse chopping and proceeding to finer degrees of diminution, the final stage being usually performed in a so-called sausage cutter.

In any event, known sausage producing machines, such as meat grinders and cutters, as well as the individual process steps are dependent upon the desired end product and are controlled by operational processes controlled by, or responsive to, the equipment and the condition of the material being processed. The interdependence between the technological process steps and the constructive characteristics of the processing machinery define the end product as well as the effectiveness and efficiency of any one of the machines in the operating cycle.

A first operational principle or phase of the operational cycle is characterized by the feeding and diminution of the raw material and relates directly to the grinding operation including feeding by an auger and chopping by a rotary chopping knife. That is to say, the material to be processed is conveyed or fed and compressed by the auger or feed screw to the cutting system which chops the raw material for transfer into another processing machine.

In principle, the feeding action in meat grinding machinery involves frictionally feeding and supporting the material prior to its being ground or chopped.

A second operational principle relates to super-fine chopping which is performed primarily in sausage cutters in which knives are rotating at a very high speed. For their chopping and diminuting action, these cutters rely in part upon the inertia of the mass of the raw material particles. In addition to being minced to a degree of extreme fineness, the raw material is also emulsified and mixed within the cutter. It is simplest form, such a cutter may be a concave toroidal bowl rotating about its axis with a multiple curved knife being partially submerged in the annular channel of the bowl and rotationally driven about an axis extending normal to the axis of the toroidal bowl.

Mixing of different raw materials and the infusion of spices and other ingredients constitute the a third operational principle.

The mixing aggregates used for this purpose are well known. But it is also possible to utilize cutters as well as meat grinders for the mixing action by direct feeding of the ingredients to be mixed with the raw materials into the grinder or cutter.

A fourth principle of the operation relates to filling of the prepared sausage pudding into casings by means of a filling machine. The prepared sausage pudding is fed into the filling machine through a hopper thereof and is pressed into the casing through a funnel-shaped exit by means of a pump. As the casing is filled it gradually slips off the funnel neck.

Proportioning of the filled casing is controlled by the operation of the filling machine, by intermittently interrupting its filling action. The casing is then mechanically or manually severed or cut into individual sausages for further processing by curing, smoking or cooking, for instance.

The raw material is usually fed into meat grinders and similarly working diminution machinery by way of a hopper and is then conveyed by the auger journaled in the pressure housing to a cutter arrangement. The augers and the pressure housing serve to support, to convey, and—to a certain extent—compress the raw material.

This may be accomplished by pressure and feed augers of predetermined geometric structures and pitches and by additional elements, such as flue gaps, which further improve the operation.

The diminution machine for superfine chopping, i.e. the cutters previously mentioned, are as a rule disposed in a horizontal plane and are journaled for rotation about their own axis. The knives extending into the bowl of the cutter are curved or shaped like a sickle with the cutting edge at the convex edge and are rotating at a very high speed. Advantageously, the cutting is performed under vacuum pressure. Other super diminution equipment such as high speed grinding, chopping or knife aggregates are available to provide extremely finely chopped raw materials.

All hitherto known processes of and machinery for producing sausage filling are functioning in accordance with the mentioned principles and are structured accordingly. It will thus have been seen that the technological sequence of sausage production is quite complex for it invariably involves repeated conveying and receiving of intermediate product from one stage and machine to another.

OBJECTS OF THE INVENTION.

It is thus an object of the present invention to provide automated diminution and emulsifying apparatus for producing fillings or puddings for all kinds of sausages including smoked, cured, cooked and boiled sausages, and which ensures that large pieces of meat may be received from a substantially pressure-free feed hopper into a slowly moving meat grinder operating on shearing principles, for repeated feeding, chopping and recirculation, with the process parameters being adjusted in accordance with changes in the condition of the raw material to provide a final product of the required or desired consistency.

Another object of the invention resides in the provision of an apparatus for making sausage from raw material in a substantially uninterrupted operation.

Still another object of the invention resides in the provision of a single apparatus for performing the multitude of functions hitherto performed by a plurality of sequentially arranged separate machines.

Other object will in part be obvious and will in part appear hereinafter.

BRIEF SUMMARY OF THE INVENTION.

In accordance with a currently preferred embodiment of the invention, there is provided a diminution and emulsifying apparatus for making sausages of different degrees of fineness provided with first and second feeding and cutting systems as well as an additional cutting system with a sausage filling device directly associated therewith, and a mixing member provided intermediate the first and second feeding and cutting systems and the additional cutting system, the first and second feeding and cutting systems and the additional cutting system being of the kind typical for meat grinding apparatus and being provided with double feed screws and cutting sets supported in a housing of the apparatus in cooperative relationship with each other, a by-pass leading from the additional cutting system to the second feeding and cutting system.

BRIEF DESCRIPTION OF THE SEVERAL DRAWINGS.

The novel features which are considered to be characteristic of the invention are set forth with particularity in the appended claims. The invention itself, however, in respect of its operating steps and the sequence thereof, and the structure, construction, design and lay-out, as well as manufacturing techniques involved in apparatus for practicing the invention, together with other objects and advantages thereof, will be best understood from the following description of a preferred embodiment when read with reference to the drawings, in which:

FIG. 1 is a schematic representation, in top elevation and partially in section, of a diminution and emulsifying apparatus in accordance with the invention; and FIG. 2 is the apparatus of FIG. 2 in front elevation.

DETAILED DESCRIPTION OF THE PREFERRED EMBODIMENT.

Figure 1:
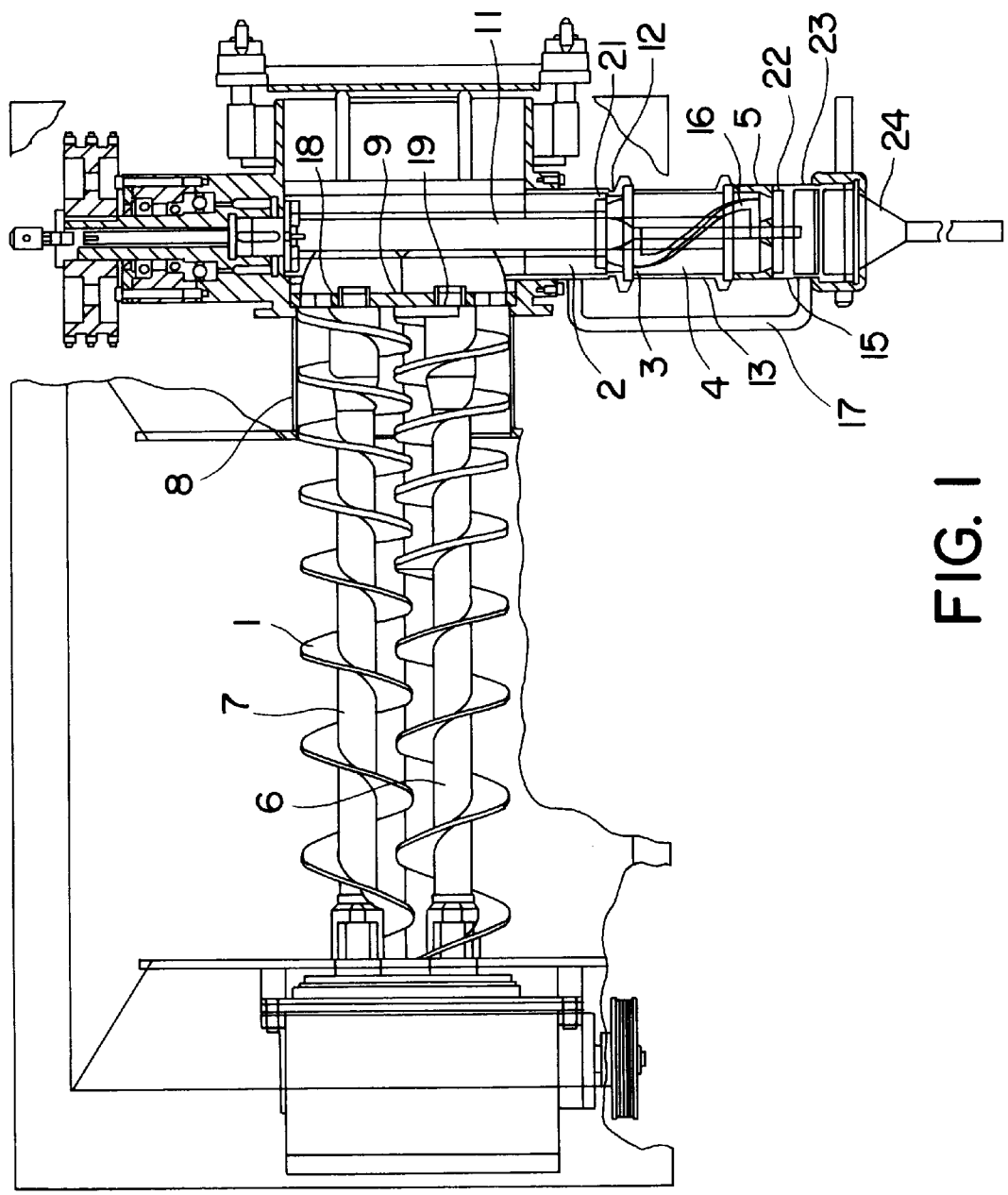

The apparatus in accordance with the invention is shown to consist of the combination of a first feeding and cutting system 1, a second feeding and cutting system 2 connected to the output of the first system, and a third cutting system 5, connected to the second feeding and cutting system 2 by way of a mixing chamber 4.

To satisfy a technological flow, these four systems are arranged within a machine made up of components of the kind typical of meat grinders, and combined such that the inventive process of diminution and emulsifying operates on the meat grinding principle. Computerized process controls are provided for open and closed loop control of the entire operation on the basis of factors typical of the process.

The drives of the apparatus consist of conventional electric motors; the complete drive system of the machine being described infra.

The first feeding and cutting system 1 consists of two operating or feed screws 6, 7 arranged parallel to each other and supported in a housing 8 such that they may receive raw material to be processed from an open hopper (not shown) for feeding to a first cutter assembly 9. The cutter assembly 9 consists of a precutter or perforated plate 18 and a rotating knife 19 for reducing the raw material to chunks measuring between about 20 and 120 mm. The precutter 18 is secured against rotation in the housing 8, and the knife 19 is mounted on a knife pin for rotation with the operating or feed screws 6, 7.

The first cutting arrangement 9 is clamped by a biasing member 20 acting directly on the first cutting arrangement 9 and biases it against the screws 6, 7, thus establishing, in conjunction with housing 8, the conditions necessary for cutting (FIG. 2). The housing 8 is structured to join the position 10 at which the raw material passes to the next operating system.

The second feed system 2 is disposed at the transition area 10 and the biasing member 20, the coarsely chopped raw material passing from the first feeding system 1 to the second feeding system 2 in a direction normal thereto.

The second feeding and cutting system 2 consists of double screw pumps 11 and a second cutting arrangement 12. The operation of feeding the coarsely chopped raw material to the second feeding and cutting system 2 is carried out under vacuum pressure. The raw material is fed to the second cutting arrangement 12 by the double screw pumps 11 without any further compression. The second cutting arrangement 12 generates counter pressure of the kind required to bring about qualitatively acceptable cutting.

The continuous feeding of the raw material builds up pressure of up to 50 bar in a pressure chamber 21 located between the double screw pumps 11 and the cutting arrangement 12. This pressure build up ensures that the raw material is pressed from a housing 13 and the screw pumps 11 through the second cutting arrangement 12 where it is subjected to further diminution and from where it is conveyed, maintaining its pressure, into a mixing chamber 4.

In the mixing chamber 4, where the pressure may be as high as 50 bar, there is provided a mixing member 16 appropriately configured for its intended purpose. The mixing chamber 4 is also provided with suitable inlets 3 through which necessary additives, such as, for instance, spices and water, may be fed into the mixing chamber 4 for intermixing and emulsification with the raw material in the mixing chamber 4. The mixing member 16 augments the mixing action in a positive way.

Preferably, the mixing member 16 is structured as a Z-shaped lever arm or as a screw body with one or more flights provided with flow-through openings for improving the quality of the mixing and emulsifying action.

The raw material will pass from the mixing chamber 4 at a particle size from about 3 to 10 mm and enter the area of the third cutter system 5. The third cutting system consists of a multi-component cutter set of up to nine components, and the final perforated disk 15 of which determines the particle size of the sausage filling.

Depending upon the kind of final perforated disk 15 used in the cutter set 15 of this third cutting system 5, the particle size of the raw material may be reduced down to 0.4 mm. The third cutting system 5 is structured such that a filling nozzle 24 may be attached to the housing 23 for filling the sausage filling produced in the diminution and emulsifying apparatus into appropriate casings.

A further significant characteristic of the diminution and emulsifying apparatus of the invention is that the raw material exiting from the third cutting system 5 may be subjected to renewed mixing and emulsifying by means of a by-pass or return conduit 17 connecting the output of the cutting system 5 to the second feeding and cutting system 2. Advantageously, the conduit 17 is provided with a valve (not shown) controlled either manually or automatically in response to signals generated, for instance, as a function of the particle size of the sausage filling exiting from the third cutting system 5. The return conduit 17 is such that it prevents exposure of the raw material to ambient air.

Ingredients such as spices and water are fed into the mixing chamber 4 through the inlets 3 by an external high pressure dosage system (not shown). Sensors are provided at and within the mixing chamber 4 for monitoring the properties of the sausage filling and the condition of the chamber, and for generating and feeding corresponding signals to an external process control (not shown). The process control may be provided with a memory in which look-up tables representative of desirable sausage properties and chamber conditions are stored with which the incoming signals are compared for purposes of controlling the dosage system, and the feed screw drives in response to differences between the signals and the stored data. The signals may be representative of the temperature, viscosity and agglutination of the sausage filling and of the pressure within the mixing chamber 4, as determinants for adding further spices and ingredients.

The drives of the entire system may consist of conventional electric motors, hydraulic and magnetic drives, the first and second feeding and cutting systems 1 and 2 being preferably driven by separate motors, although a combined drive linked to the systems by appropriate transmission aggregates would also be possible.

The second and third cutter sets 12, 22 may be driven by the drive of the double screw pumps 11 by directly connecting the cutter sets to the drive shafts of the screws pump 11. It would also be possible to drive the two cutter sets 12 and 22 by an external drive shaft supported in the second feeding and cutting system 2.

The superfine chopping of the raw material is carried out by the third cutting system 5, the cutter set 22 of which being to this end made up of seven to nine components. Its multiple components may be varied to ensure that the final product emerging from the third cutter set 22 is suitable for direct filling into sausage casings.

The apparatus herein proposed relies upon operational principles not unlike those of meat grinders, yet it ensures that sausage filling is produced in an uninterrupted multi-stage process the final one being filling the product into casings. The quality of the product thus obtained is in many ways superior to conventionally produced product because the product need not be taken from one machine and filled into another one. In fact, during the entire processing operation, the product, once fed through the hopper into the first feeding and cutting system may be processes without exposure to ambient air so that the possibility of its contamination is significantly reduced.

Importantly, the usually open conventional cutter is dispensed with entirely, for the superfine chopping hitherto performed by cutters is now performed by the novel apparatus. As a consequence, the production is significantly more efficient and economical. It leads to reduced factory space requirements, lower energy consumption and fewer operating personnel. Whereas the energy consumed by traditional equipment is about 50 Wh/kg, the energy requirements of the novel system have been measured as 20 Wh/kg. Because a cutter is no longer required, the exposure of the sausage filling to germs and other biological contaminants is reduced. Moreover, the novel machinery prevents the product from becoming unduly heated. Its protein chains are, therefore, relatively unaffected which, in turn significantly increases its ability to absorb water.

As will be appreciated by those skilled in the art, the advantage of the diminution and emulsifying apparatus in accordance with the invention resides in the fact that beginning with coarse chopping of raw material and terminating with charging of casings with sausage filling, the entire production process is performed in a continuous and operational sequence in a single machine.

The process is performed by a plurality of simultaneously operating feeding and cutting systems acting sequentially on the raw material, the process steps being designed and coordinated with respect to each other such that they act upon the raw material in the desired sequence while at the same time reacting to the changes occurring in the raw material.

The feeding of the raw material for the chopping up thereof commences with pieces of raw material weighing several kilos being received in the feed hopper in a non-pressurized from an open container to be conveyed by feed screws to a first diminution stage where they are reduced to pieces weighing between about 50 to 200 grams. The diminution is accomplished by components of a cutter set associated with, and operatively connected to, the feed screws of the conveying system.

The purpose of this stage is to reduce the raw material pieces to a size appropriate for a subsequent high pressure feed operation by a corresponding conveying apparatus. To supplement the reception of the raw material vacuum pressure is applied to draw the material toward the high pressure feed elements. These elements may be displacement screws having different pitches.

The high pressure feeding operation is carried out in a sealed system which does not, however, subject the raw material to compression. It only moves the material proportionally. This is accomplished by filling feed cells with raw material which then dispense it, and by mass feeding at high density build up to the required high pressure of 10 to 50 bar. Following the high pressure area, the raw material is moved to one or two spatially separated cutting systems. A mixing and kneading apparatus is provided between the two cutting systems where the raw material is prepared for final production.

Where two or three cutting systems are applied, the first one is used to precut the raw material in accordance with the final product. The second cutting system affects a further diminution of the raw material, whereas the third cutting system chops the raw material to a particle size desired for the final product so that the raw material is reduced to sausage filling ready for filling into casings. Water and spices are added under high pressure in appropriate doses at a mixing and kneading chamber to ensure their distribution in the material and to provide for the required consistency.

The process performed by the apparatus is such that the material may be repeatedly fed through second and third cutting systems thus providing for subjective controls and interventions.

The entire system is process controlled. Product data regarding the material to be chopped is derived from appropriate sensors following the second cutting system and are utilized for open and closed loop controls of the machine as well as for the introduction of additives.

The sequence of the process steps described is accomplished by a chopping and emulsifying apparatus designed to have a cutting systems at the output end of feed screws, the cutting system reducing the size of the material fed into it. Further feeding and cutting systems, including a high pressure cutting system, perform final chopping operations, a filler being associated with the final cutting system for filling the sausage filling into casings.

The cutting systems are multi-component sets which are put together in accordance with requirements dictated by the production process and the desired end product.

What is claimed is:

1. A meat diminution and emulsifying apparatus for making sausages, comprising:
   means for forming a housing having a plurality of interconnected chambers therein;
   first means for feeding meat including at least one rotatably driveable first screw mounted in one of said chambers, said feeding means having an input adjacent to one end of said first screw and a first output adjacent to an opposite end of said first screw;

first means for cutting meat mounted adjacent to said first output for rotation with said first screw;

second means for feeding meat including a rotatably driveable second screw mounted in another of said chambers, said second feeding means having an input adjacent to one end of said second screw and connected to said first output and a second output adjacent to an opposite end of said second screw;

second means for cutting meat mounted adjacent to said second output for rotation with said second screw;

third rotatably driveable means for cutting meat mounted in said housing spatially displaced from said second meat cutting means and provided with an output section;

means for forming a meat mixing and kneading chamber in said housing means intermediate said second and third cutting means;

conduit means for selectively recirculating meats from said output section to said second feeding means; and means for dispensing meat from said output section.

2. The apparatus of claim 1, wherein said first means for feeding meat comprises a pair of screws with their axes disposed in parallel.

3. The apparatus of claim 2, wherein at least one of said pair of screws is provided with a first axial pin and wherein said first means for cutting meat comprises a first perforated disk mounted in said housing and secured against rotation and a first knife mounted on said first pin for rotation relative to said first perforated disk.

4. The apparatus of claim 3, wherein said second means for feeding meat comprises at least one screw member.

5. The apparatus of claim 4, wherein said one screw member is provided with a second axial pin and wherein said second means for cutting meat comprises a second perforated disk mounted in said housing and secured against rotation and a second knife mounted on said second pin for rotation relative to said second perforated disk.

6. The apparatus of claim 5, wherein said one screw member comprises an axial extension extending through said mixing and kneading chamber, said extension being provided with means extending laterally into said mixing and kneading chamber for mixing and kneading meat fed into said chamber.

7. The apparatus of claim 6, wherein said extension is provided with a third axial pin and wherein said third means for cutting meat comprises at least one perforated disk mounted in said housing and secured against rotation and a third knife mounted on said third axial pin for rotation relative to said one perforated disk.

8. The apparatus of claim 7, wherein said third means for cutting meat comprises a plurality of axially arranged alternating perforated disks and knives.

9. The apparatus of claim 1, wherein said input comprises a hopper.

10. The apparatus of claim 1, wherein said first and second means for feeding meat are disposed substantially normal to each other.

11. The apparatus of claim 6, wherein said mixing and kneading means comprises a screw provided with flights having openings in the flanks thereof.

12. The apparatus of claim 1, wherein said mixing and kneading chamber is provided with means for feeding additives thereunto.

13. The apparatus of claim 1, wherein said means for feeding and cutting meat are driven by at least one electromagnetic motor.

* * * * *